US007561928B2

(12) United States Patent
Peureux et al.

(10) Patent No.: US 7,561,928 B2
(45) Date of Patent: Jul. 14, 2009

(54) METHOD FOR THE AUTOMATIC OPTIMIZATION OF A NATURAL GAS TRANSPORT NETWORK

(75) Inventors: Eglantine Peureux, Asnieres (FR); Benoît Casoetto, Bourg-la-Reine (FR); Tony Pillay, Cluis (FR); Marie Benoit, Fontenay-Aux-Roses (FR)

(73) Assignee: Gaz de France, Paris (FR)

( * ) Notice: Subject to any disclaimer, the term of this patent is extended or adjusted under 35 U.S.C. 154(b) by 269 days.

(21) Appl. No.: 11/800,416

(22) Filed: May 4, 2007

(65) Prior Publication Data

US 2007/0260333 A1 Nov. 8, 2007

(30) Foreign Application Priority Data

May 5, 2006 (FR) .................................. 06 51635

(51) Int. Cl.
*G05B 13/00* (2006.01)
*G05D 7/00* (2006.01)
*G06G 7/50* (2006.01)
*F17D 3/00* (2006.01)

(52) U.S. Cl. ............................. 700/28; 700/282; 703/9

(58) Field of Classification Search ............. 700/28–37, 700/44–46, 281, 282, 301; 702/45, 47, 50, 702/51, 55, 182–184; 703/2, 7, 9, 10, 18
See application file for complete search history.

(56) References Cited

U.S. PATENT DOCUMENTS 4,200,911 A * 4/1980 Matsumoto .................. 700/28
4,562,552 A * 12/1985 Miyaoka et al. ............. 700/283
4,835,687 A * 5/1989 Martin .......................... 705/7
6,697,713 B2 * 2/2004 Megan et al. ............... 700/301
6,701,223 B1 * 3/2004 Rachford et al. ............ 700/301
6,829,566 B2 * 12/2004 Sage .......................... 702/183
6,957,153 B2 * 10/2005 Esposito, Jr. ................. 702/32
6,970,808 B2 * 11/2005 Abhulimen et al. ......... 702/185
2006/0241924 A1 * 10/2006 Harper et al. .................. 703/7
2007/0168174 A1 * 7/2007 Davari et al. .................. 703/18
2008/0082215 A1 * 4/2008 McDowell .................. 700/282

FOREIGN PATENT DOCUMENTS

FR 2 587 086 3/1987

* cited by examiner

*Primary Examiner*—M. N. Von Bhur
(74) *Attorney, Agent, or Firm*—Weingarten, Schurgin, Gagnebin & Lebovici LLP

(57) ABSTRACT

The method of automatic optimization is applied to a natural gas transport network in the steady state comprising at one and the same time a set of passive works such as pipelines or resistances, and a set of active works comprising regulating valves, isolating valves, compression stations, storage or supply devices, consumption devices, elements for bypassing the compression stations and elements for bypassing the regulating valves, the passive works and the active works being linked together by junctions. The optimization method comprises the determination of values for continuous variables. Intervals of values for the continuous variables and sets of values for the discrete variables are chosen as initial state of the optimization. The possibilities of values for the variables are explored by constructing on the go a tree with branches linked to nodes describing the combinations of values envisaged by using a separation of variables and evaluation technique, the values of the quantities sought being considered to be optimal when predetermined constraints are no longer violated or are minimally violated and a predetermined objective function is minimized.

12 Claims, 6 Drawing Sheets

| Node | Initialization pressure intervals (bar) |
|---|---|
| 0 | [40 ; 40] |
| 1 | [1 ; 60] |
| 2 | [1 ; 60] |
| 3 | [1 ; 60] |
| 4 | [42 ; 60] |

FIG.6

| Arc | Initialization flow rate intervals (in $m^3/h$) |
|---|---|
| I | [800 000 ; 800 000] |
| II | [-1 600 000 ; 1 600 000] |
| III | [100 000 ; 800 000] |
| IV | [-1 600 000 ; 1 600 000] |
| V | [100 000 ; 800 000] |
| VI | [-1 600 000 ; 1 600 000] |
| VII | [800 000 ; 800 000] |

FIG.7

| Test No. | Compressor 1 | Compressor 2 | Results |
|---|---|---|---|
| A1 | direct | direct | Intervals of the variables reduced |
| A2 | direct | indirect | The propagation culminates in an empty interval |
| A3 | indirect | direct | The propagation culminates in an empty interval |
| A4 | indirect | indirect | The propagation culminates in an empty interval |
| B1 | free | direct | Compressor 4 oriented in the forward direction and intervals of the variables reduced |
| B2 | free | indirect | The propagation culminates in an empty interval |
| C | free | free | Compressors 4 and 5 oriented in the forward direction and intervals of the variables reduced |

FIG.8

| Node | Result pressure intervals (bar) |
|---|---|
| 0 | 40 |
| 1 | [21.3 ; 39.2] |
| 2 | [42.7 ; 60] |
| 3 | [21 ; 39.2] |
| 4 | [42 ; 59.5] |

FIG.9

| Arc | Result flow rate intervals (in $m^3/h$) |
|---|---|
| I | 800 000 |
| II | [150 000 ; 646 000] |
| III | [150 000 ; 646 000] |
| IV | [154 000 ; 650 000] |
| V | [154 000 ; 650 000] |
| VI | [150 000 ; 646 000] |
| VII | 800 000 |

FIG.10

METHOD FOR THE AUTOMATIC OPTIMIZATION OF A NATURAL GAS TRANSPORT NETWORK

This application claims priority to French application No. 06 51635 filed May 5, 2006.

The subject of the present invention is a method for the automatic optimization of a natural gas transport network in the steady state, the natural gas transport network comprising at one and the same time a set of passive works including pipelines or resistances, and a set of active works comprising regulating valves, isolating valves, compression stations each with at least one compressor, storage or supply devices, consumption devices, elements for bypassing the compression stations and elements for bypassing the regulating valves, the passive works and the active works being linked together by junctions, the optimization method comprising the determination of values for continuous variables such as the pressure and the flow rate of the natural gas at any point of the transport network, and the determination of values for discrete variables such as the startup state of the compressors, the state of opening of the compression stations, the state of opening of the regulating valves, the state of the elements for bypassing the compression stations, the state of the elements for bypassing the regulating valves, the orientation of the compression stations and the orientation of the regulating valves.

The present invention is intended to make it possible to determine in particular the optimal values of pressure and flow rate at any point of a natural gas transport network in the steady state. The invention is also intended to make it possible to determine in an optimal and automatic manner not only continuous variables, such as the flow rate, which can take all the values lying in an interval, but also discrete variables that can take only a finite number of values.

By way of example, the opening of a valve is a discrete variable, since this valve can only be open (which can be represented for example by a 1) or closed (which can then be represented by a 0).

The method according to the invention is thus intended to make it possible to determine in an automatic and optimal manner in particular factors such as the opening of the valves, the starting up of the compressors, the orientation of the active works (compression station and regulating valves), the state of the bypass elements for these active works, or even the serial or parallel adaptation of certain compressors.

To determine the characteristics of a gas transport network by calculation, regardless of the physical modelling adopted, the node law and the mesh law (also dubbed Kirchhoff's laws because they are borrowed from electric circuit theory) are traditionally taken into account.

A gas transport network may be represented in the form of a graph composed of nodes (vertices) and arcs which establish an oriented relationship between two nodes. The arcs possess a "STATE" attribute which indicates whether the arc is activated or deactivated.

According to the node law, there is for all the nodes of the network equality between the amount of gas entering a node and the amount of gas leaving this node and overall everything that enters the network must leave it.

To summarize, according to the node law, the following system of linear equations is obtained:

$$B.E_{arcs}=E_{consumptions}+E_{resources}+C_{stations}$$

with B: network incidence matrix expressing the correspondence between the arcs and the nodes of the network, $E_{arcs}$: vector of the amounts flowing in each arc, $E_{consumptions}$: vector of the amounts delivered to the consumptions, $E_{resources}$: vector of the amounts emitted or injected at the resources (storage or supply devices), $C_{station}$: vector of the amounts of fuel gas consumed by the compression stations.

The node law thus makes it possible to define a system of linear equations.

All the amounts entering or leaving are algebraic and their sign is defined by choosing a convention. Anything entering a node may be considered to be positive, whilst anything leaving it may be considered to be negative.

According to the mesh law, the algebraic sum, along a mesh, of the differences in gas pressure between two consecutive nodes is zero. The mesh law thus makes it possible to define a system of equations:

$$\sum_{mesh} \Delta P = 0$$

with ΔP: difference in pressures between two consecutive nodes of a mesh.

Since the formulae for the head loss in the pipelines is known in the following form: $P_1^2-P_2^2=\alpha\times Q\times|Q|$, the mesh law can also be expressed in an equivalent manner with the aid of differences in pressure squared:

$$\sum_{mesh} \Delta P^2 = 0$$

with $\Delta P^2$: difference in the squared pressures between two consecutive nodes of a mesh.

The mesh law thus makes it possible to define a system of nonlinear equations.

Network calculation methods which tackle the problem by assuming that the latter is perfectly determined, that is to say by assuming that the number of unknowns is equal to the number of equations, are already known.

If one considers a network of N nodes and M meshes, it is deduced therefrom that the number of arcs is equal to N+M−1, to which there correspond as many independent equations, namely N−1 equations according to the node law and M equations according to the mesh law.

Kirchhoff's two laws make it possible to determine flow rates (in so far as the mesh law replaces the squared pressure differences with their equivalent expression as a function of flow rate, in general of the form $\Delta P^2=\alpha\times Q^2$ where α is considered constant.

When the system of equations for these two laws is solved, the flow rates are known everywhere and the prescribing of a particular pressure at any node of the network enables the pressures to be ascertained at all the nodes.

Traditionally, the simulation methods aimed at determining the continuous variables at every point of a network comprise a first phase of solving Kirchhoff's two laws and of obtaining the flow rates everywhere and a second phase of prescribing a pressure at a particular node and of obtaining the pressures everywhere.

Generally, the process iterates several times between phase No. 1 and phase No. 2 since the coefficients α involved in the mesh law relationships are not perfectly constant and depend very slightly on the pressures and flow rates.

This approach imposes two major restrictions. The first restriction is that it applies only to networks that comprise only pipelines or, more generally, passive works. Specifically, passive works exhibit a relationship between the difference in the pressures upstream and downstream of the work and its flow rate. This relationship is the head loss equation properly speaking. Armed with this relationship, it is always possible to replace the differences in pressures by their flow rate dependent expression. On the other hand, an active work, such as a regulating valve or a compression station, does not necessarily exhibit such a relationship or at least, if this equation exists, it contains at least one additional unknown.

Active works constitute network control members while introducing additional unknowns such as, for example, the degree of opening of a regulating valve. Knowing the degree of opening and considering a certain number of characteristic coefficients provided by the constructor, the pressures upstream, downstream and the flow rate can be related to this percentage opening.

In the case of compression stations, the unknown introduced is the driving compression power (power expended in respect of compression) since the latter is related to the flow rate and to the compression ratio (ratio of its downstream pressure to its upstream pressure).

Generally, the network calculation methods allowing the simulation of active works require the user to fix the value of these unknowns himself. Implicitly, the active works are then no longer so since they exhibit a genuine equation for head loss (or gain in the case of compression). Typically, the way around this proposed by these methods consists in asking the user to prescribe either the compression power in the case of a compression station, or the degree of opening of the valve in the case of an expansion, etc. The prescribing of these quantities establishes a link between the flow rate of the work and its upstream and downstream pressures. Thus armed with such a relationship, it is therefore possible to solve Kirchhoff's second law.

The entire difficulty consists in determining what power of the compression stations or what degree of opening of the regulating valves to prescribe. It is not always possible, at least in a reasonable time, to find manually according to a trial and error approach a set of values that are suitable in particular for a complex network where the meshes are interconnected with one another.

The second restriction is the need to prescribe a pressure at a particular node of phase No. 2. On account of the first restriction, the network is assumed to be composed solely of passive works. By prescribing this particular pressure and after solving Kirchhoff's two laws, the pressures can be known everywhere.

If the network comprises just a single source, it would seem to be natural to prescribe the pressure at the particular node which is the node of this source. In general, the highest possible pressure is prescribed at this point and the whole set of pressures at all the nodes then constitutes the maximum pressure regime. Another approach is to choose at the source node a pressure which is as low as possible so long as the pressures at all the nodes are not below a fixed threshold. The whole set of pressures at all the nodes then constitutes the minimum pressure regime.

If the minimum pressure regime exhibits greater pressures than the maximum pressure regime, this implies that it is not possible to find a pressure at the source node which, at one and the same time:

- is less than the maximum pressure of this node,
- is greater than a limit value which makes it possible to satisfy all the minimum pressure thresholds at all the nodes.

The network is said to be saturated.

In the case of a network comprising just a single source, the flow rate of the latter injected into the network is perfectly determined by the node law. This is no longer the case if a second source is present in the network since the number of nodes is not modified (hence no additional equation) and an extra unknown corresponding to the flow rate of this second source is introduced into the problem.

The traditional network calculation methods get round this case by creating a fictitious mesh between the two sources. This mesh is said to be fictitious since it is assumed that the two sources are linked by a pipeline of zero length and of very large diameter. Introducing this new mesh provides the system of equations with the missing additional equation. The balance between the number of unknowns in the problem and the number of equations is then re-established. In general, the fictitious pipeline is constructed in such a way that it exhibits a constant head loss law ($\Delta P^2 = C^{cons}$). With this fictitious pipeline, prescribing a pressure at just one of the two sources of the network enables the pressures to be ascertained at all the nodes of the network.

This process has the drawback however, that if the constant in the head loss law for the fictitious pipeline is too big, then solving Kirchhoff's second law leads to finding a flow rate which leaves the network in the case of the second source, which may not be desirable when dealing, as is the case here with a source, stated otherwise with a network gas inlet.

The approach of calculating the network in its entire generality by simulation is therefore not satisfactory since the search for the optimal values of the powers and pressures and flow rates to be prescribed must be undertaken manually.

To remedy these drawbacks, it has already been proposed that a greater number of unknowns than the number of equations be employed, so that there exist several solutions to the problem posed and that a particular solution will be chosen according to a given criterion, which determines an optimization.

Certain known methods are however designed for calculating networks in a dynamic regime rather than in the steady state.

Other methods of optimization for calculating networks in the steady or dynamic state prescribe particular conditions and constraints which render these methods incomplete or rather inflexible.

The present invention is aimed at remedying the aforesaid drawbacks and in making it possible to automatically determine in an optimal manner all the degrees of freedom of a gas transport network in the steady state, with minimization of an economic criterion and nonviolation of the constraints, or minimal violation of the constraints.

The invention is more particularly aimed at effecting a hybridization of a combinatorial and continuous optimization procedure so as to determine the values of the whole set of discrete and continuous variables, in an entirely automatic manner.

These aims are achieved, in accordance with the invention, by virtue of a method for the automatic optimization of a natural gas transport network in the steady state, the natural gas transport network comprising at one and the same time a set of passive works such as pipelines or resistances, and a set of active works comprising regulating valves, isolating valves, compression stations each with at least one compressor, storage or supply devices, consumption devices, elements for bypassing the compression stations and elements for bypassing the regulating valves, the passive works and the active works being linked together by junctions, the optimization method comprising the determination of values for continuous variables such as the pressure and the flow rate of the natural gas at any point of the transport network, and the determination of values for discrete variables such as the startup state of the compressors, the state of opening of the compression stations, the state of opening of the regulating valves, the state of the elements for bypassing the compression stations, the state of the elements for bypassing the regulating valves, the orientation of the compression stations and the orientation of the regulating valves, characterized in that intervals of values for the continuous variables and sets of values for the discrete variables are chosen as initial state of the optimization, in that the possibilities of values for the variables are explored by constructing on the go a tree with branches linked to nodes describing the combinations of values envisaged by using a technique of separation of variables, that is to say of cutting leading to the generation of new nodes in the tree, and of evaluation, that is to say of determination with a high probability of the branches of the tree which may lead to leaves constituting an optimized final solution, so as to traverse by priority these branches having greater probability of success, the values of the quantities sought being considered to be optimal when predetermined constraints are no longer violated or are minimally violated and a predetermined objective function is minimized, this objective function being of the form $$g=\alpha\times\text{Regime}+\beta\times\text{Energy}+\gamma\times\text{Target}$$

with: α, β and γ are weighting coefficients.

Regime represents a minimization or maximization factor for the pressure at given points of the network such as any point downstream of a storage or supply device, any point upstream and any point downstream of a compression station or of a regulating valve, and any point upstream of a consumption device, Energy represents a minimization factor for the consumption of compression energy, Target represents a maximization or minimization factor for the flow rate of a stretch of the network situated between two junctions or the pressure of a particular junction, and the said predetermined constraints comprising on the one hand equality constraints comprising the law for the head loss in the pipelines and the node law governing the calculation of the networks, and on the other hand inequality constraints comprising minimum and maximum flow rate constraints, minimum and maximum pressure constraints for the active or passive works, compression power constraints for the compression stations.

More generally, the problem of the optimal configuration of the active works is modelled in the form of an optimization programme $P_1$ that takes the following form:

$$P_1\begin{cases}\min_{(x,s,e)} f(x,s)=g(x)+\alpha\times\|s\|^2\\ C_I(x)+\beta.e\le s_I\\ C_E(x)=s_E\\ x\in R^n,\ s_I\in R^p,\ s_E\in R^q,\ e\in\{0,1\}^p\end{cases}$$

with: x is the set of variables for the flow rates Q and pressures P, g(x) is the objective function constituting an economic optimization criterion, $C_I(x)$ is the set of p linear and nonlinear inequality constraints on the active works, β is a matrix whose coefficients are zero or equal to the maximum values of the constraints, e is the vector of binary variables, of dimension p in order that the equation involving them be consistent, but the number of binary variables is actually: 3×the number of active works, $C_E(X)$ is the set of q linear or nonlinear equality constraints, s is a deviation variable which, when it is nonzero, represents the violation of a constraint, α is a coefficient representing the degree of permission to violate constraints.

According to a particular embodiment, the variables are represented by intervals, the separation of variables technique is applied to the discrete variables only and bounds of the objective function are calculated by using the arithmetic of intervals.

According to another particular embodiment, the variables are represented by intervals, the separation of variables technique is applied at one and the same time to the discrete variables and to the continuous variables, separation comprising the cutting of the definition space of the continuous variables, exploration being performed separately on parts of the realisable set and the interval of variation of the objective function being evaluated on each of these parts.

In this case, advantageously, during the exploration of the possibilities of values for the variables with a separation of variables and evaluation technique, a list of nodes to be explored sorted according to a merit criterion M calculated for each node is firstly established, so long as the list of nodes to be explored is not empty, for each current node, an evaluation is made as to whether this current node can contain a solution, if so, the interval corresponding to the variable considered is cut according to a separation law to establish a list of child nodes, for each child node minimum and maximum bounds of the objective function are evaluated and an evaluation is made as to whether the child node can improve the current situation, if so, a propagation of the constraint over its variables is performed, if the propagation does not lead to empty intervals, minimum and maximum bounds of the objective function are evaluated and it is verified that it is not impossible for the child node to contain at least one feasible solution, a test is performed to determine whether there are still noninstantiated discrete values, that is to say variables for which no precise and definitive value could be decided, the best current solution is updated if appropriate and the merit of the node is calculated so as to insert it into the list of leaves, sorted according to this merit criterion.

The method according to the invention can in particular implement the following advantageous characteristics:

The merit criterion M is such that a node is explored by priority when it exhibits the smallest minimum bound of the objective function.

During the tests for eliminating the nodes that cannot contain the optimum, one of the procedures consisting in using the monotonicity of the objective function, in using a test of violated constraints or in using a test of objective value that is not as good as the current value is implemented.

During the separation of a current node into child nodes, the domain of variation of one or more chosen variables is divided according to criteria based on the diameter of intervals tied to the variables.

The method furthermore comprises a stopping criterion based on the execution time or on the evaluation of certain interval diameters.

As a supplement to the propagation of the constraints, the maximum bound of the optimum of the objective function is updated using the so-called Fritz-John optimality conditions of the optimization problem.

When at a node of the separation and evaluation method all the discrete variables have been instantiated, a nonlinear optimization process based on an interior points procedure is moreover implemented.

Alternatively, at each node of the separation and evaluation method, a nonlinear optimization process based on an interior points procedure is moreover implemented.

Other characteristics and advantages of the invention will emerge from the following description of particular embodiments, given by way of examples, with reference to the appended drawings, in which:

FIG. 6 is a table giving examples of initialization pressure intervals for various nodes of the network part of FIG. 5;

FIG. 7 is a table giving examples of initialization flow rate intervals for various arcs of the network part of FIG. 5;

FIG. 8 is a table giving the results of tests performed on the network part of FIG. 5;

FIG. 9 is a table giving the results of the pressure intervals for the various nodes of the part of the network of FIG. 5 in the cases of the table of FIG. 8 where propagation is not halted;

FIG. 10 is a table giving the results of the flow rate intervals for the various arcs of the part of the network of FIG. 5 in the cases of the table of FIG. 8 where propagation is not halted;

The present invention applies in a general manner to all gas transport networks, in particular those for natural gas, even if these networks are very extensive, on the scale of a country or a region. Such networks may comprise several thousand pipelines, several hundred regulating valves, several tens of compression stations, several hundred resources (points where gas enters the network) and several thousand consumptions (points where gas leaves the network).

The method according to the invention is aimed at automatically determining all the degrees of freedom of a network in the steady state, in an optimal manner.

The values are optimal in the sense that the constraints are not violated and an economic criterion is minimized or, if this is not possible, the constraints are minimally violated.

The degrees of freedom are the pressures, flow rates, compressor startups, open/closed, in-line/bypass states and the forward or reverse orientations of the active works.

For a real network, there exist several hundred integer-value variables (for example 1 for open and 0 for closed) in addition to the several thousand continuous variables (pressures and flow rates).

The method according to the invention makes it possible to run the calculation in series, that is to say without human intervention. This autonomous nature of the calculation is of major interest in a context of networks that may give rise to a multiplicity of routing scenarios.

Figure 1:
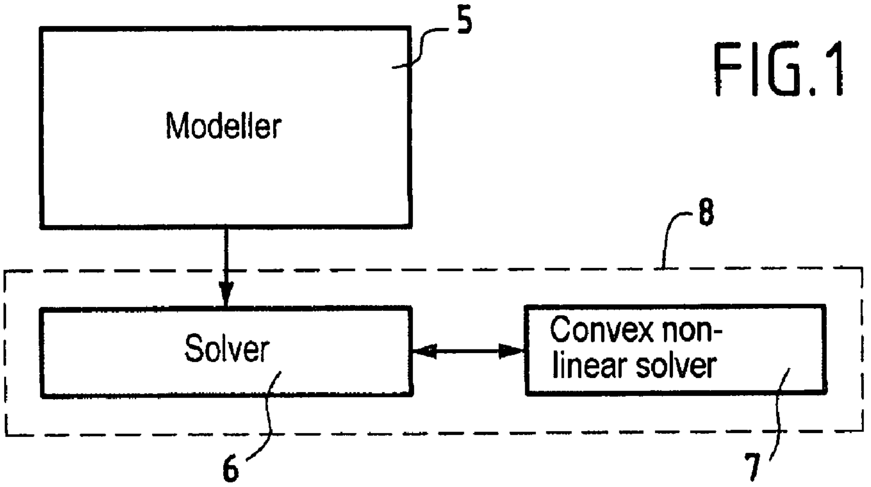
FIG. 1 is a block diagram showing the main modules of a system for the automatic optimization of a gas transport network according to the invention.

FIG. 1 is a block diagram illustrating the principal modules implemented within the framework of the definition of a gas transport network.

The module 5 constitutes a modeller which is an assembly allowing the modelling of the network. This is understood to mean its physical description via its works and its structure (connected subnetworks, pressure blocks, etc.). This modeller preferably also includes means for simulating (or balancing) the network in terms of flow rates and pressures.

The module 8 constitutes for its part a computational core permitting network optimization.

The optimization module 8 essentially comprises a solver 6 whose functions (in particular implementation of the separation of variables and evaluation technique) will be explained later and a convex nonlinear solver 7 which can act as a supplement to the solver 6.

Figure 2:
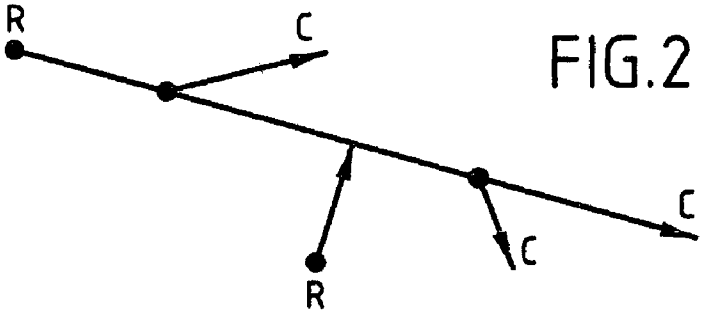
FIG. 2 is a schematic view of an exemplary part of a gas transport network.

FIG. 2 schematically shows a gas transport network part comprising various gas tapoff points for local consumptions C. A pressure constraint dependent on the consumption requirements is associated with each tapoff point.

The part of the transport network also comprises gas feed points for providing the network with gas from local resources R which may for example be gas reserves stored in underground cavities.

The capacity of the network stretch depends both on the level of the consumptions C and the movements in feed based on the resources R.

In a gas transport network, the gas pressure decreases progressively during transmit. In order for the gas to be routed while complying with the allowable pressure constraint in respect of the consumer, the pressure level must be raised regularly with the aid of compression stations distributed over the network.

Each compression station comprises at least one compressor and generally includes from 2 to 12 compressors, the total power of the installed machines possibly being between around 1 MW and 50 MW.

The delivery pressure of the compressors must not exceed the maximum service pressure (MSP) of the pipeline.

Figure 3:
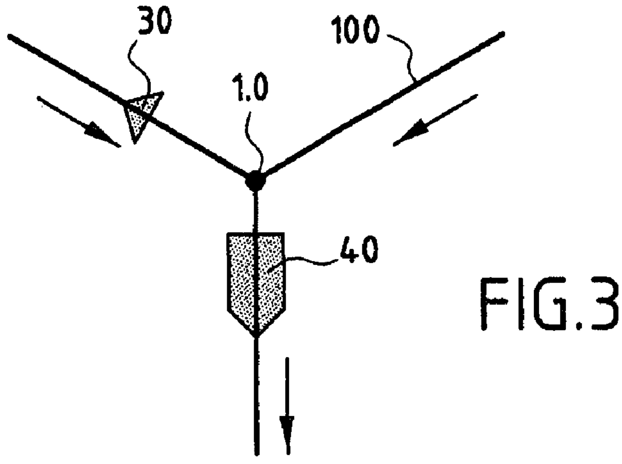
FIG. 3 is a schematic view of an exemplary configuration of a compression station situated at a point of interconnection of a gas transport network.

FIG. 3 illustrates an exemplary configuration of a compression station which is situated at the same time at an interconnection point 1.0 of the network. A first feed pipeline 100 is joined to the interconnection point 1.0. A second feed pipeline on which a pressure regulating valve 30 is placed is also joined to the interconnection point 1.0. One or more compressors 40 are arranged on a third pipeline which commences at the interconnection point or junction 1.0.

According to a typical exemplary embodiment, there may be a pressure of 51 bar in the first pipeline 100, a pressure of 59 bar in the second pipeline upstream of the regulating valve 30, a pressure of 51 bar in the second pipeline downstream of the regulating valve 30 and a pressure of 67 bar in the third pipeline downstream of the compressors 40.

The present invention is aimed at automatically optimizing the movements of gas over complex networks, the method offering both high robustness and high accuracy.

In the subsequent description, it will be considered that the expression “active work” encompasses the regulating valves and the compression stations as well as the isolating valves, the resources and the storage facilities.

The expression “passive work” covers the pipelines and the resistances.

The aim of the method according to the invention is to search for the appropriate settings for the active works and to establish a map of network flow rates and pressures so as to optimize an economic criterion.

The economic criterion is composed of three different terms:

the pressure regime: minimizes or maximizes the pressures downstream of the storage facilities and resources, upstream and downstream of the compression stations and of the regulating valves and upstream of the consumptions, the energy: minimizes the consumption of compression energy, the target: maximizes or minimizes the flow rate of an arc or the pressure of a particular node.

In the mathematical optimization problem, this criterion is called the objective function. In this function, each term is weighted by a coefficient (α, β and γ) which gives it greater or lesser importance:

$$g = \alpha \times \text{Regime} + \beta \times \text{Energy} + \gamma \times \text{target}$$

The degrees of freedom are:

the pressures at each node, the flow rates in each arc, for the continuous variables, which can take all the values lying in an interval.

The degrees of freedom are:

the opening/closing of the active works, the bypassing of the compression stations and regulating valves, the orientation of the compression stations and regulating valves, the startup of the compressors, for the discrete parameters or discrete variables, which can take only a finite number of values.

The aim is to find the values of the variables which minimize the economic criterion. The search for the values of the variables is subject to constraints of various types:

equality constraints: law for the head loss in the pipelines, node law. These constraints are intrinsic to the network, hence they cannot be violated;

inequality constraints: constraints on minimum and maximum flow rate, minimum and maximum pressure of the works, constraints on the compression power of the stations, constraints on minimum and maximum speed of the gas at each node, pressure drop constraints for the regulating valves and for the compression stations, pumping and boosting constraints on the turbocompressors, constraints on the minimum and maximum delivery pressures of the compressors, constraints on the daily minimum and maximum energy of the consumptions, etc. These constraints are inherent in the works of the network or related to the network contractual constraints (example: minimum pressure for a customer); they give limits that are not to be exceeded, but some of them may be violated.

Mathematically, these constraints are of two types: linear or nonlinear.

To model a gas transport network in its entirety, it may be considered that to each state of an active work there corresponds a binary variable e (which takes the value 1 when the state is active or 0 in the converse case, for example 1 for open and 0 for closed). It is thus possible to model the choice between each of the states solely with linear constraints. The principle is illustrated below in the case of a compression station.

Example for a compression station:

Let $x=(Q,P_{upstream},P_{downstream})$ be the trio of the continuous variables for the flow rates Q and pressures $P_{upstream}$ and $P_{downstream}$ of the compression station.

Let $e_f$, $e_b$, $e_d$, $e_i$ be the 4 binary variables associated with the 4 alternative states—closed, bypassed, forward and reverse—that cannot occur simultaneously. Let $C_f(x)$, $C_b(x)$, $C_d(x)$, $C_i(x)$, be the 4 constraints for these 4 disjunctive states. For example, for the forward state, $C_d(x)$ is the vector of constraints on minimum and maximum flow rates, minimum and maximum compression ratios and minimum and maximum powers.

Let $C_{f\ max}$, $C_{b\ max}$, $C_{d\ max}$, $C_{i\ max}$ be an estimate of the maximum values of these constraints, regardless of x. In the example of the forward state, $C_{d\ max}$ is the vector of minimum and maximum flow rates, minimum and maximum compression ratios and minimum and maximum powers.

The linear constraints may therefore be written in the form:

$C_f(x) \leqq (1-e_f).C_{f\ max}$, $C_b(x) \leqq (1-e_b).C_{b\ max}$, $C_d(x) \leqq (1-e_d).C_{d\ max}$, $C_i(x) \leqq (1-e_i).C_{i\ max}$, $e_f+e_b+e_d+e_i=1$ so as to ensure the choice of one and only one of the 4 states.

Starting from this principle, it is also possible to perform a modelling, keeping only the three variables $e_b$, $e_d$, $e_i$, thus reducing the combinatorics.

These variables will be integrated into the constraints in the following manner:

$C_f(x) \leqq (e_b+e_d+e_i).C_{f\ max}$, $C_b(x) \leqq (1-e_b).C_{b\ max}$, $C_d(x) \leqq (1-e_d).C_{d\ max}$, $C_i(x) \leqq (1-e_i).C_{i\ max}$, $e_b+e_d+e_i \leqq 1$ so as to ensure the choice between one of the 4 states, the closed state corresponding to the 3 zero variables.

Thus the problem of the optimal configuration of the active works is modelled in the form of an optimization program that is mixed (associating continuous variables and binary variables) and nonlinear (since part of the constraints $C_f(x)$, $C_b(c)$, $C_d(x)$, $C_i(x)$ is nonlinear)

The general program may therefore be written in the following form:

$$P_0 \begin{cases} \min_{(x,e)} g(x) \\ C_I(x) + \beta.e \le 0 \\ C_E(x) = 0 \\ x \in R^n,\ e \in \{0, 1\}^p \end{cases}$$

with:—x, the set of variables for the flow rates and pressures (Q. P), g(x), an a priori nonlinear objective function. This is the economic criterion (example: the cost of operating the active works, such as the fuel gas consumed by the compression station), $C_i(x)$, the set of linear constraints (constraints on bounds) and nonlinear constraints on the active works; these constraints are inequality constraints and there are p of them, β, a vector whose coefficients are zero or equal to the maximum values of the constraints, e, the vector of binary variables, of dimension p in order that the equation involving them be consistent, but the number of binary variables is actually: 3×the number of active works, $C_E(x)$, the set of linear equality constraints (example: node law), and nonlinear constraints (example: head loss equations for the pipelines). There are q of them.

The method according to the invention is aimed at providing a response regardless of the state of saturation of the network. That is to say, the method is required to permit, if it cannot do anything else, certain constraints to be violated in order to yield a result, even in the case of saturation. The permission to violate the constraints is tempered since it will be sought to minimize it and since it will lead to a saturation message anyway. Taking this requirement into account, the problem is written slightly differently by introducing the variables s which, if they are nonzero, represent the violation of the constraints.

$$P_1\begin{cases}\min_{(x,s,e)} f(x, s) = g(x) + \alpha \times \|s\|^2 \\ C_I(x) + \beta.e \le s_I \\ C_E(x) = s_E \\ x \in R^n,\ s_I \in R^p,\ s_E \in R^q,\ e \in \{0, 1\}^p\end{cases}$$

with: x is the set of variables for the flow rates Q and pressures P,

- g(x) is the objective function constituting the economic optimization criterion,
- $C_I(x)$ is the set of p linear and nonlinear inequality constraints on the active works,
- β is a vector whose coefficients are zero or equal to the maximum values of the constraints,
- e is the vector of binary variables of dimension p in order that the equation involving it be consistent, but the number of binary variables is actually: 3×the number of active works,
- $C_E(x)$ is the set of q linear or nonlinear equality constraints,
- s is a deviation variable which, when it is nonzero, represents the violation of a constraint,
- α is a coefficient representing the degree of permission to violate constraints.

Note that, with fixed binary variables, the program $P_1$, which is not strictly equivalent to $P_0$, has a solution close to $P_0$ if the coefficient α is chosen sufficiently large since the deviation variables $s_I$ and $s_E$ are then sought very close to 0 indeed.

This is a sizeable combinatorial problem since it includes several hundred integer variables in addition to several thousand continuous variables.

This mixing of the type of variables necessitates combinatorial and continuous optimization. This is why several mathematical procedures that are able to accommodate both these types of optimization are preferably combined in a hybrid manner in order to ultimately obtain an exact solution.

The method according to the invention first implements a separation of variables and evaluation technique, termed "Branch & Bound" (hereinafter denoted B&B). This technique covers a class of optimization procedures that are capable of dealing with problems involving discrete variables. The discrete nature of a variable is unlike the continuous nature:

- a continuous variable can take any value in a given interval. Within the framework of network calculation, this will be the case for the pressures expressed in bars, for example: P∈[40,80],
- a discrete variable can take only a certain number of values. They are often binary variables which represent for example the direction of operation of a compression station for example x=0 (forward direction) or x=1 (reverse direction).

The B&B procedure is a tree-like procedure and consists in reducing the domain of variation of the variables as the tree is constructed. This procedure is commonly used to obtain the global minimum of an optimization problem involving binary variables.

In order to use the B&B procedure to solve a mixed problem, i.e. a problem dealing with both discrete and continuous variables, several variants may be envisaged:

- $B\&B_1$: the B&B procedure separates only with regard to the binary variables. The variables are represented by intervals. It will thus be possible to calculate the bounds of the objective function using the arithmetic of intervals.
- $B\&B_2$: the B&B procedure separates both with regard to the binary variables and the continuous variables; this involves an interval-based representation. In this case, the separation principle (branch) will consist in cutting the space defining the continuous variables rather than fixing the discrete variables at one of their values. Thus, parts of the realizable set will be explored separately and the interval of variation of the objective function will be bounded on these subparts.

Setting up a B&B separation of variables and evaluation procedure therefore requires a choice of strategies relating to:

the selecting of the node to be examined:

depending on the date of arrival of the nodes in the stack, their positioning or the value of a merit function calculated with each candidate node,

- the evaluating of the bounds of the current solution which makes it possible to advance through the B&B procedure,
- the eliminating of the nodes that cannot contain the optimum (test for violated constraints, for objective value not as good as the current value, use of the monotonicity of the objective function),
- the separating of the current node into (two or more) child nodes by dividing the domain of variation of one or more variables (chosen according to criteria based on the diameter of intervals tied to the variable(s), the diameter or the width of an interval corresponding to the difference between its maximum bound and its minimum bound),
- the stopping criterion based on the execution time or on the evaluation of certain diameters.

For the problem of the optimal configuration of the active works, the B&B procedures consist in progressively fixing the state of the active works, and evaluating at each step, among these partial combinations, those which might lead to the most favourable global combination.

Figure 4:
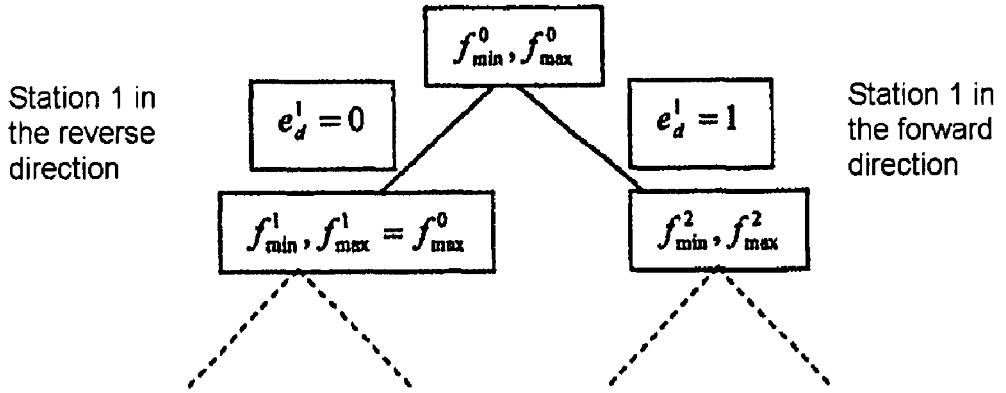
FIG. 4 is a schematic view showing the process for exploring a tree according to the separation of variables and evaluation technique.

An example will be described with reference to FIG. 4.

Consider a gas network in which there are several compression stations. It is sought, for example, to minimize the fuel gas in the network. If compression station No. 1 is chosen at the start of the B&B tree and if the binary variable associated with its state is tested ($e_d^1=1$).

$f_{min}^i$ is the minimum bound of the objective function calculated at node i, knowing the set of decisions that have already been taken.

$f_{max}^i$ is the maximum bound of the objective function associated with the best combination of states known when exploring node i.

If $f_{min}^1 > f_{max}^1$ (with $f_{max}^1 = f_{max}^0$) then it is certain that station 1 oriented in the reverse direction ($e_d^1=0$) cannot lead to the optimum solution.

On the other hand, if $f_{min}^1 \leqq f_{max}^1$ the exploration continues while fixing another binary variable. All the binary variables are thus fixed progressively. If no cut is made in a branch, a realizable configuration is obtained, that is to say the whole set of binary variables has been fixed and the whole set of constraints is complied with.

Various techniques may be associated with the separation of variables and evaluation technique.

In particular, it is possible to use constraint propagation which makes it possible to exploit the information from the equation or from the inequality to decrease the intervals of the variables of this equation.

Only the nonlinear equation C(x) is considered and, generally, we seek to solve:

$$C(x)\in[a,b]\subseteq IR \text{ where } x\in X\subseteq IR^n$$

with: IR is the set of intervals,

X is a vector of intervals of dimension n.

The constraint propagation may be based on constructing a computation tree which represents C(x). Initially, the value of the intermediate nodes and of the root node corresponding to the value of the constraint is calculated on the basis of the leaves of the tree, which are the variables and the constants (this being equivalent to applying the rules of interval arithmetic), and then the value of the interval of the constraint is propagated from the root of the tree to the leaves so as to reduce the definition spaces of the variables.

The algorithm for propagating a constraint over its variables is as follows:

Step 1, propagation: construction of the computation tree for the constraint C, the leaves are the interval variables $x_i$ or real constants, in each node is stored the result of the partial and unitary operation that it represents, for example $x_a+x_b$, the last computation is performed at the root.

Step 2, retropropagation: descent through the tree from the root to the leaves. At each node, we attempt to reduce the partial result calculated in 1.

For example: $x_a+x_b=[a,b]\Rightarrow$ $x_a:=([a,b]-x_b)\cap x_a$ and $x_b:=([a,b]-x_a)\cap x_b$ FIG. 12 illustrates the propagation/retropropagation of the constraints for the following equation given by way of example:

$2x_3x_2+x_1=3$ with $x_1=[1,3]$, for $i\in\{1,2,3\}$

Figure 12:
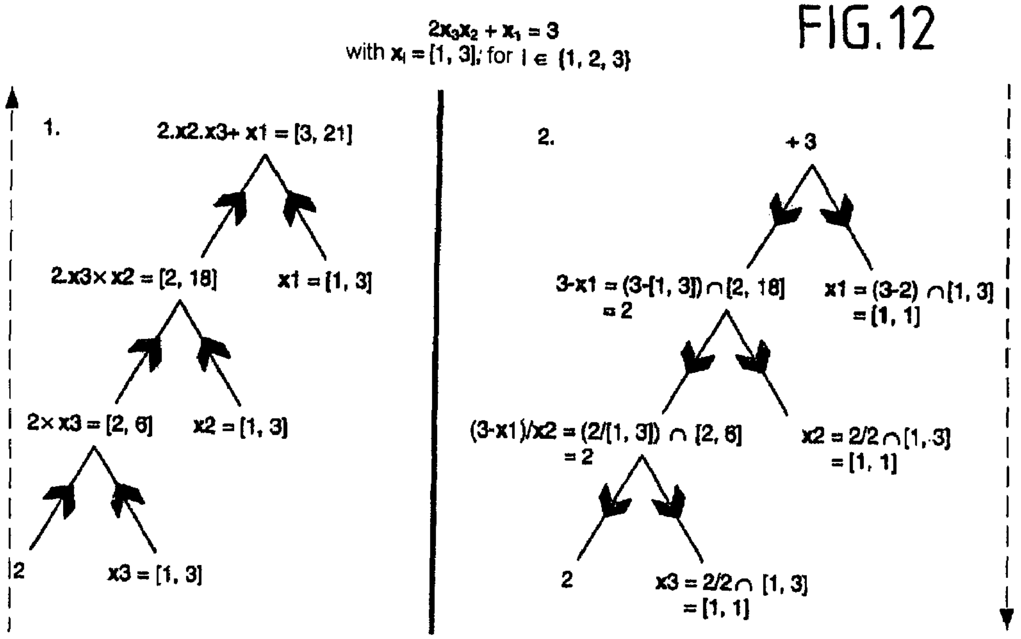
FIG. 12 is a diagram showing a calculation tree which represents the propagation/retropropagation of constraints.

The first step of the algorithm is presented in the left-hand part of FIG. 12: starting from the values of the variables and constants, each unitary operation constituting the expression is performed until the value of the left-hand side of the expression is obtained at the top of the tree; this node is the root node.

The second step of the algorithm is explained by the right-hand part of FIG. 12: we want the left-hand side to be equal to a specific value, we therefore re-descend through the tree from the root, by virtue of the inverse operations of those used in the first part, we seek to reduce the intervals of each node and especially that of the variables. In the example, propagation has made it possible to reduce each interval of the variables from [1,3] to [1,1], that is to say the variables have been instantiated at 1, thanks to propagation alone.

The algorithm for propagation over the whole set of constraints of a problem is performed as follows:

1. Initialization of the Queue of Constraints to be Propagated

To do this, all the constraints are inserted, without duplication, into a queue sorted according to a merit criterion M.

2. Loop Over the Queue of Constraints

```
While the queue is not empty {
Extraction of the "best" constraint C (for the
criterion M)
Propagation of C
If propagation has led to an empty interval for at
least one variable {
   Exit the loop: there is no solution to the
   problem
}
```

-continued

```
Else {
For each variable modified by the propagation
of C {
   For each constraint involving this variable {
         If the constraint is not already
         resolved, add to the queue
            }
         }
      }
   }
```

According to an exemplary embodiment, only the "age" of the constraint is involved in the merit criterion M, i.e. the queue is equivalent to a FIFO stack. However, a more complex criterion can be used. For example, a variable that is greatly reduced by the propagation of a constraint could lead to the constraints involving it being inserted into the queue with a high merit.

It will be noted that a constraint is said to be resolved when it is already satisfied regardless of the values that the variables take in their intervals (stated otherwise, if the interval resulting from the propagation over the constraint contains only acceptable values.

For a constraint C of an inclusion function $C(X)=|\underline{C(X)}, \overline{C(X)}|$, is resolved if:

C is an equality constraint and $C(X)=0$,

C is a positive inequality constraint and $\underline{C(X)}\geqq 0$,

C is a negative inequality constraint $\overline{C(X)}\leqq 0$.

When a constraint is resolved, its propagation will no longer lead to any reduction in the intervals of its variables.

The constraint propagation technique may be used for example to determine the orientation of the active works of gas transport networks. The active works may simply be considered to be oriented in the forward direction when the flow rate is positive and in the reverse direction when the flow rate is negative. It is also possible to perform a complete modelling of the configuration of the active works by involving 3 or 4 binary variables, as indicated above. The implementation of the constraint propagation technique may be performed with the aid of an interval arithmetic and constraint propagation library capable of dealing with discrete variables.

The constraint propagation procedures may on the one hand serve to reduce the combinatorics within reduced times, during a first step that may precede an exact or approximate optimization process, and on the other hand be integrated with the B&B procedures to allow better computation of the bounds of the objective function and possibly additional cuts at each node.

In particular, in the latter case where the constraint propagation is performed within a node of the search tree and is used to prune the nodes that can be declared infeasible, and to decrease the diameter of the intervals of the variables, then the constraints involving the variable or variables whose separation has led to the creation of the node undergoing evaluation are considered in the initial queue of constraints to be propagated. If this node is the root of the tree, then all the constraints are placed in the queue.

By way of exemplary implementation of a constraint propagation technique, reference will be made to FIGS. 5 to 10.

Figure 5:
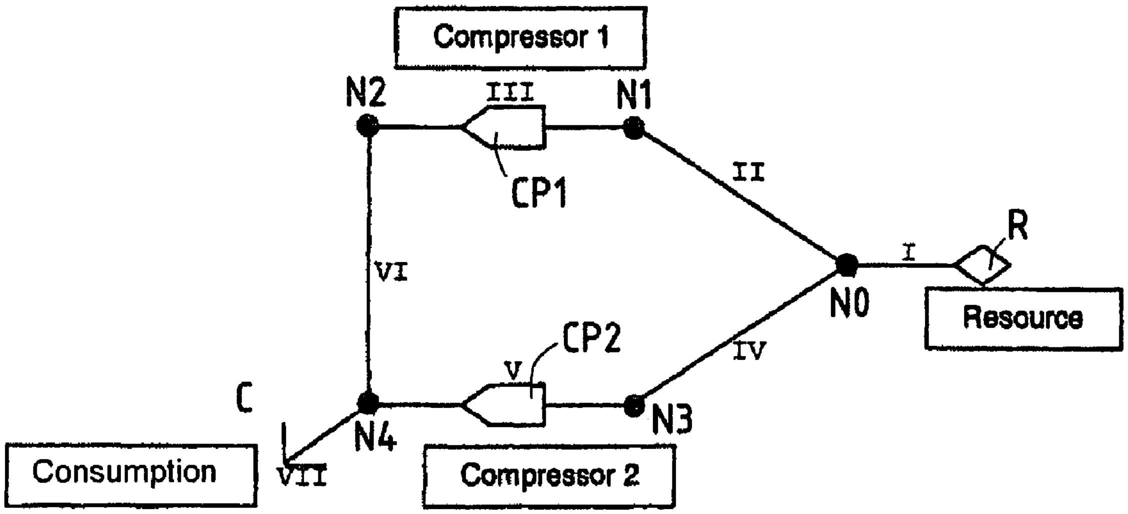
FIG. 5 is a schematic view of an exemplary part of a network, to which part the optimization method according to the invention is applied.

FIG. 5 depicts a simple gas transport network comprising a resource R, a consumption C, a first compressor CP1 and a second compressor CP2. The network comprises nodes $N_0$ to $N_4$ (junctions or interconnection points) and arcs I to VII (pipelines or stretches comprising the compressors CP1, CP2, the resource R and the consumption C).

The network defines five pressure variables at the nodes $N_0$ to $N_4$ and seven flow rate variables in the arcs I to VII.

FIG. 6 gives an example of initialization pressure intervals (in bars) at the various nodes $N_0$ to $N_4$.

The resource A has a setpoint pressure of 40 bar. This is why its initialization interval is a zero-width interval.

The consumption node $N_4$ has a minimum delivery pressure of 42 bar, hence initialization in the interval [40, 60].

FIG. 7 gives an example of initialization flow rate intervals (in $m^3/h$) in the arcs I to VII.

The resource R and the consumption C corresponding to the arcs I and VII have prescribed flow rates of 800 000 $m^3/h$. Their intervals are therefore initialized to zero-width intervals.

The arcs III and V containing the compressors CP1 and CP2 respectively exhibit smaller flow rate intervals than the arcs II, IV and VI corresponding to simple pipelines.

Several tests are performed:

A. We firstly test all the combinations of orientation of the compressors CP1, CP2 (tests A1 to A4).

B. The orientation of the compressor CP1 is left free and that of the compressor CP2 is fixed (tests B1 and B2).

C. The orientations of both compressors CP1, CP2 are left free (test C).

The results of these tests A1 to A4, B1, B2 and C are presented in the table of FIG. 8.

In the three cases where propagation is not halted (tests A1, B1 and C), the identical results presented in the tables of FIGS. 9 and 10 are obtained.

FIG. 9 indicates the resulting pressure intervals (in bar) at the various nodes $N_0$ to $N_4$.

FIG. 10 indicates the resulting flow rate intervals (in $m^3/h$) for the various arcs I to VII.

In these examples it may be seen that the information contained in the constraints is used to reduce the intervals of the variables and also makes it possible to fix the value of certain discrete variables (here the orientation of each compressor). In particular, it may be seen that if the orientation of one or both compressors is left free, by applying the constraint propagation procedure alone, it may be concluded that the free compressor must be oriented in the forward direction.

The constraint propagation procedure as well as the separation of variables and evaluation procedure (B&B) call upon interval-based computation the main characteristics of which will be recalled below.

In interval arithmetic, one manipulates intervals containing a value, rather than numbers which more or less faithfully approximate this value. For example, a measurement error can be allowed for by replacing a value measured x with an uncertainty $\epsilon$ by an interval $[x-\epsilon, x+\epsilon]$. It is also possible to replace a value by its validity range such as a pressure P of a resource represented by an interval [4, 68] bar. Finally, if one wishes to obtain a valid result for an entire set of values, one uses an interval containing these values. Specifically, the objective of interval arithmetic is to provide results which definitely contain the value or the set sought. One then speaks of guaranteed, validated or even certified results.

As has been implicitly accepted up to now, the intervals that do not contain any "hole", are closed connected subsets of R. The set of intervals will be denoted IR. They can be generalized in several dimensions: an interval vector $x \in IR^n$ is a vector whose n components are intervals and an interval matrix $A \in IR^{m \times n}$ is a matrix whose components are intervals. A graphical representation of an interval vector of IR, $IR^2$ and $IR^3$ corresponds respectively to a straight segment, a rectangle and a parallelepiped. An interval vector is therefore a hyper-parallelepiped. Hereinafter, the terms interval vector, tile, box or even interval will be used interchangeably.

The interval objects are denoted by bold characters: x. We denote by $\underline{x}$ the minimum of x and $\overline{x}$ its maximum. We then have $x=[\underline{x}, \overline{x}]$ and we consider the partial order on $IR^n$:

$$X \leq Y \Leftrightarrow x_i \leq y_i \text{ for } i=1 \ldots n.$$

We denote by w(x) the width of x (with w for width) or else its diameter:

$$w(x)=\overline{x}-\underline{x}$$

The centre mid(x) and its radius rad(x) are defined by:

$$mid(x) = \frac{\overline{x}+\underline{x}}{2}$$

$$\mathrm{rad}(x) = \frac{\overline{x}-\underline{x}}{2} = \frac{w(x)}{2}$$

A function $F: IR^n \rightarrow IR$ is an inclusion function of f over $X \in IR^n$. If $X \in X$ then $f(X) \in F(X)$.

The adjective "pointlike" designates a standard numerical object (that is to say a real number, or a vector, a matrix of real numbers) and it is the same as the zero-diameter interval.

The result of an operation $\diamond$ between two intervals x and y is the smallest interval (in the inclusion sense) containing all the results of the operation applied between all the elements x of x and all the elements y of y, that is to say containing the set:

$$\{x \diamond y; x \in x, y \in y\}$$

Likewise, the result of a function F(z) is the smallest interval containing the set:

$$\{f(z); z \in z\}$$

If we consider the traditional operators +, −, x, $^2$, / or $\sqrt{}$, it is possible to define the following formulae that are more practical to use than the theoretical definition above:

$$[\underline{x}, \overline{x}] + [\underline{y}, \overline{y}] = [\underline{x}+\underline{y}, \overline{x}+\overline{y}]$$

$$[\underline{x}, \overline{x}] - [\underline{y}, \overline{y}] = [\underline{x}-\overline{y}, \overline{x}-\underline{y}]$$

$$[\underline{x}, \overline{x}] \times [\underline{y}, \overline{y}] = [\min(\underline{x}\times\underline{y}, \overline{x}\times\underline{y}, \underline{x}\times\overline{y}, \overline{x}\times\overline{y}), \max(\underline{x}\times\underline{y}, \overline{x}\times\underline{y}, \underline{x}\times\overline{y}, \overline{x}\times\overline{y})]$$

$$[\underline{x}, \overline{x}]^2 = \begin{cases} [\min(\underline{x}^2, \overline{x}^2), \max(\underline{x}^2, \overline{x}^2)] & \text{if } 0 \notin [\underline{x}, \overline{x}] \\ [0, \max(\underline{x}^2, \overline{x}^2)] & \text{otherwise} \end{cases}$$

$$1/[\underline{x}, \overline{x}] = [\min(1/\underline{x}, 1/\overline{x}), \max(1/\underline{x}, 1/\overline{x})] \text{ if } 0 \notin [\underline{x}, \overline{x}]$$

$$[\underline{x}, \overline{x}]/[\underline{y}, \overline{y}] = [\underline{x}, \overline{x}] \times (1/[\underline{y}, \overline{y}]) \text{ if } 0 \notin [\underline{y}, \overline{y}]$$

$$\sqrt{[\underline{x}, \overline{x}]} = \left[\sqrt{\underline{x}}, \sqrt{\overline{x}}\right] \text{ if } 0 \leq \underline{x}$$

The traditional algebraic properties (that is to say for pointlike arithmetic) such as reciprocity between addition and subtraction or distributivity of multiplication with respect to addition are no longer satisfied:

subtraction is no longer the reciprocal of addition. Specifically:

$$x-x=\{x-y|x\in x, y\in x\} \supset \{x-x|x\in x\}=\{0\}$$

also, division is no longer the reciprocal of multiplication, by the same reasoning as above, we obtain:

$$x/x \supset \{1\}$$

multiplication of an interval by itself is not the same as squaring. Let us take the example where x=[−3,2]:

$$x \times x=[-6,9]$$

$$x^2=[0,9]$$

multiplication is not distributive with respect to addition.

Let us take x=[−2,3], y=[1,4] and z=[−2,1]:

$$x\times(y+z)=[-10,15]$$

$$x\times y+x\times z=[14,16]$$

multiplication is in fact sub-distributive with respect to addition, that is to say:

$$x\times(y+z)\subset x\times y+x\times z$$

It is thus possible to define elementary functions such as the sine, the exponential, etc. that take intervals as argument. To do this, the abstract definition above is used.

If one is interested in a monotonic function, the formulae for calculating it are readily deduced.

On the other hand, we only know how to define the elementary functions over intervals contained in their domain of definition: for example, the logarithm will be defined only for strictly positive intervals.

Interval arithmetic makes it possible to calculate with sets and to obtain general and valuable information for the global optimization of a function.

To prevent the results being overestimated, it is preferable to use for the function to be taken into account an expression in which each variable appears only once.

Various separation of variables and evaluation procedures (B&B) using interval arithmetic will be described below.

A B&B procedure can be characterized as 5 steps:

1. selection: choice of the node to be examined,
2. evaluation of the bounds (bounding),
3. elimination: destruction of the nodes that cannot contain the optimum,
4. separation: construction of 2 child nodes by dividing the domain of variation of a variable,
5. stopping criterion.

Various solutions may be chosen for these 5 steps in order to improve the quality of the method.

Consider the optimization problem $\min_{X\in X} f(X)$. The vector of intervals of dimension n, $X\in IR^n$, is the search zone. The function f: $R^n\rightarrow R$ is the objective function.

We denote by f* the global minimum of the problem, X* an optimal point such that f(X*)=f*, and the set of these points X*:

$$f^*=\min_{X\in X} f(X) \text{ and } X^*=\{X\in X \mid f(X)=f^*\}$$

The interval objects are denoted by bold characters: x. We denote by $\underline{x}$ the minimum of x and $\overline{x}$ its maximum. We then have $x=[\underline{x},\overline{x}]$ and we consider the partial order over $IR^n$:

$$X\leqq Y \Leftrightarrow x_i\leqq y_i \text{ for } i=1\ldots n.$$

We denote by w(x) the width of x (with w for width) or else its diameter:

$$w(x)=\overline{x}-\underline{x}$$

The centre mid(x) and its radius rad(x) are defined by:

$$mid(x)=\frac{\overline{x}+\underline{x}}{2}$$

$$\text{rad}(x)=\frac{\overline{x}-\underline{x}}{2}=\frac{w(x)}{2}$$

A function $F:IR^n\rightarrow IR$ is an inclusion function of f over $X\in IR^n$. If $X\in X$ then $f(X)\in F(X)$.

Here are various rules for selecting the node to be examined from the list of waiting nodes. Of course, these strategies may be combined: for example the "Best first" strategy is often combined with the "Oldest first" strategy as second criterion if there are equal rankings.

1. Oldest First

This strategy consists in examining the node created earliest first.

2. Depth First

This strategy consists in examining the node at the deepest level of the tree first, i.e. the node with the most ascendants.

3. Best First [Moore-Skelboe Rule]

This strategy consists in favouring the node which corresponds to the smallest $\underline{F(X)}$, i.e. the one with the smallest lower bound of the optimum.

4. Reject Index a. Optimum Known

For each node corresponding to the interval vector X, let us define the parameter:

$$pf^*(X)=\frac{f^*-\underline{F(X)}}{w(F(X))}$$

We note that if w(F(X)) is zero, then there is no need to evaluate pf* since the node will not be cut.

The node selected is then the one corresponding to the largest value of pf*. However, the calculation of this parameter requires that the optimum be known in advance, and this is not always the case. This is why variants of the "reject index" based on estimates of the optimum have been developed.

2. Optimum Estimated

The variant of the parameter pf* when the optimum is not known in advance may be written:

$$pf^*(f_k,X)=\frac{f_k-\underline{F(X)}}{w(F(X))}$$

where k is the index of the relevant iteration. The index k corresponds globally to the number of nodes examined and $f_k$ is an approximation of f* at iteration k.

We note that the "best first" rule is therefore only ever a particular case of pf for which $f_k=\underline{f_k}$. Specifically, if $Y_0$ is the interval of the node exhibiting the smallest lower bound of F ("best node"), then we have $pf(Y_0)=0$ and pf negative for all the other nodes.

Other possibilities for $f_k$ may be:

$$f_k=\frac{\underline{F_k}+\overline{F_k}}{2}$$

or else $$f_k=\underline{F_k}$$

c. With Constraints

For a constrained problem of the form:

$$\begin{cases}\min f(X)\\ C_i(X)\leq 0,\ i=1\ldots p\\ X\in R^n\end{cases}$$

The "reject index" strategies defined above take no account whatsoever of the constraints and are at risk of selecting nodes which exhibit good values of pf but lead to infeasible nodes.

Certain authors therefore propose that a feasibility index be constructed in the following manner.

For a constraint $C_i$ and for a node corresponding to a domain of variation X, we define:

$$pu_{C_i}(X) = \min\left(\frac{-C_i(X)}{w(C_i(X))}, 1\right)$$

In the case where $w(C_i(X))=0$ the feasibility of constraint i may be decided directly, and $pu_{Ci}(X)$ may be fixed at 1 if X satisfies $C_i$, −1 otherwise. Note that if $pu_{Ci}(X)<0$, then X certainly does not satisfy $C_i$ since $\underline{C_i(X)}>0$. Conversely, if $pu_{Ci}(X)=1$ then $c_i(x)\leqq 0$ and hence $\overline{X}$ certainly satisfies $C_i$. In all other cases, the state of violation of $C_i$ is undetermined.

For the X which are not "certainly infeasible", that is to say for which $\forall i=1 \ldots p$, $pu_{Ci}(X)\geqq 0$, let us define a global feasibility index for the set of p constraints:

$$pu(X) = \prod_{l=1}^{p} pu_{C_l}(X)$$

Thus constructed, this global index possesses 2 properties:

$pu(X)=1 \Leftrightarrow X$ is "certainly feasible", $pu(X)\in[0,1] \Leftrightarrow X$ is undetermined.

This then makes it possible to define a modified reject index that builds in the feasibility index:

$$pupf(f_k,X)=pu(X)\times pf(f_k,X)$$

If $pu(X)=1$, i.e. if X is "certainly feasible", then we are back to the simple "reject index". On the other hand, if X is undetermined, this new index takes account of the degree of feasibility of X. This makes it possible to define a new node selection rule: the node with the largest value of pupf is selected.

A last criterion makes it possible to hybridize the pupf criterion with the classical "best first" criterion based on the value of $\underline{F(X)}$:

$$pupfb^*(f_k, X) = \begin{cases} \dfrac{\underline{F(X)}}{pupf^*(f_k, X)} & \text{if } pupf^*(f_k, X) \neq 0 \\ M si pupf^*(f_k, X) = 0 \end{cases}$$

with M a very large value fixed beforehand.

Indeed if $pupf(f_k,X)=0$ then either $pf(f_k,X)=0$, which implies—in the case where $f_k=f$—that there will certainly be no improvement in f; or $pu(f_k,X)=0$, which implies that there exists at least one constraint such that $\underline{c_i(x)}=0$. Such values of X do not seem to be very promising. This is why we fix M at a very large value.

The evaluation step will now be considered.

This step deals with evaluating the bounds of the objective function, and also those of the constraints if there are any. For the B&B procedures using interval arithmetic, the inclusion functions are generally obtained by "natural" extension of the usual functions.

Example:

If f: $x\rightarrow x^2-e^x$ and $x=[-5,2]$, then F: $x\rightarrow x^2-e^x$ is an inclusion function of f over x with:

$$x^2 = [\underline{x}, \overline{x}]^2 = \begin{cases} [\min(\underline{x}^2, \overline{x}^2), \max(\underline{x}^2, \overline{x}^2)] & \text{if } 0 \notin [\underline{x}, \overline{x}] \\ [0, \max(\underline{x}^2, \overline{x}^2)] & \text{otherwise} \end{cases}$$

$$\text{and } e^x = e^{[\underline{x},\overline{x}]} = [e^{\underline{x}}, e^{\overline{x}}]$$

For the elimination step, several procedures are possible.

1. Feasibility Test

If the problem is a problem subject to p inequality constraints $C_i$:

$$\begin{cases} \min f(X) \\ C_l(X) \leq 0, \; i = 1 \ldots p \\ X \in R^n \end{cases}$$

Let $C_i$ be an inclusion function of the constraint $C_i$. With each examination of a node corresponding to the domain of variation of X, the p constraints $C_i(X)$ are evaluated. If $\exists i\in\{1, p\}/[-\infty,0]\cap C_i(X)=\emptyset$, then it is certain that the node may not contain any feasible solution. It can therefore be pruned.

2. Cutoff Test

This is the simplest and best known elimination criterion: it involves rejecting all the nodes for which $f^*\leqq f<\underline{F(X)}$, where f is the current upper bound of the optimum.

3. Middle Point Test

Some publications make no distinction between the "cutoff test" and the "middle point test" (MPT). The MPT would in fact merely be an additional way of calculating an upper bound of $f^*$. The "cutoff test" consists in initially taking $\overline{F(X)}$ as upper bound and in then updating it at each interval division. For a constrained problem, updating is possible only when it is known that X contains at least one feasible point. In the MPT we take f(mid(X)) which is also an upper bound of the optimum. In the case of a constrained problem, it is however necessary to ensure that mid(X) is a feasible point.

4. Monotonicity Test

For an unconstrained problem, if the objective function is strictly monotonic with respect to the component $x_i$ of an interval vector X, then the optimum may not be found inside $x_i$. To determine whether f is strictly monotonic with respect to the components of X, we evaluate the n components of the inclusion function of the gradient of f over X. If for i, the resulting interval does not contain the value 0, then f is strictly monotonic with respect to $x_i$.

In this case, the component $x_i$ can be reduced to a real: $x_i$ reduces to $\overline{x_i}$ if the $i^{th}$ component of the inclusion function of the gradient is an interval which has a strictly negative upper bound, and $x_i$ reduces to $\underline{x_i}$ if the $i^{th}$ component of the inclusion function of the gradient is an interval which has a strictly positive lower bound.

For the separation step, several procedures are also conceivable:

1. Bisection on a Variable

In all of the following rules, the variable j which maximizes a merit function D is selected. Separation is therefore carried out on the variable j such that $j=\arg(\max_{i=1..n} D(i))$.

a. Largest Diameter

Here the merit function is simply the diameter of the variable: $D(i)=\omega(x_i)$. The difficulty in using this merit function is related to the need to get away from the scale factors. For example, if dealing with a network calculation problem, it will be necessary to properly scale the variables in order to be able to compare the diameters of the pressures with those of the binary variables.

To be able to get around this obstacle, a rule which is similar to the latter and which also does not involve any information about the derivatives may be defined:

$$D(i) = \begin{cases} w(x_i) & \text{if } 0 \in x_i \\ \dfrac{w(x_i)}{mig(x_i)} & \text{if } 0 \notin x_i \end{cases}$$

with $mig(X)=\min_{x \in Xi}|x|$. It would be possible to use the magnitude: $mag(X)=\max_{x \in Xi}|x|$.

This variant thus makes it possible to normalize the diameter of the intervals considered.

b. Hansen's Rule

Here, $$D(i)=w(x_i)\times w(\nabla F_i(X))$$

where $\nabla F_i$ is the $i^{th}$ component of the inclusion function of the gradient of f. The idea is to separate in the variable which has the most impact on f.

c. Ratz's Rule

Here, $$D(i)=w[(x_i-\text{mid}(x_i))\times\nabla F_i(X)]$$

The underlying idea is to reduce the diameter of w(F(X)) which, after calculation, reduces to the sum over all the directions of the term D(i).

d. Ratz's Bis Law

The underlying idea is the same, but we go up to second order:

$$D(i) = w\left[(x_i - mid(x_i)) \times \left(\nabla f_i(mid(x_i)) + \frac{1}{2}\sum_{k=1}^{n} H_{ik}(x_i - mid(x_i))\right)\right]$$

where $H_{ik}$ is the element with coordinates (i,k) of the matrix of second derivatives (Hessian) of f.

For procedures which calculate the gradient and the Hessian anyway, by automatic differentiation, this rule is not much more expensive than the others.

2. Multi-Section a. Static Multi-Section

Up to here we have considered that starting from a node, 2 child nodes were created by bisecting the tile $X \in IR^n$ in a single direction. However, it may be relevant to retain several separation directions. For example, the interval of variation of each variable can be cut into 2, $2^n$ child nodes are then created. It is also possible to cut the interval for a direction into 3 parts, thus creating 3 child nodes, or else the intervals of 2 variables into 3, creating $3^2$ children, etc.

b. Adaptive Multi-Section

We denote by (a) the rule of the largest diameter presented in 1.a, (b) the rule which separates the intervals of all the variables into 2, (c) the rule which separates the intervals of all the variables into 3.

A hybrid (adaptive) rule will use 3 parameters $P_1$, $P_2$ and pf to determine which rule to use.

The parameters $p_1$ and $p_2$ are two thresholds which will have to be adjusted. pf is the "reject index" defined above, and is a function of the relevant node.

The nodes which have a "reject index" $pf<p_1$ will be separated according to rule (a), those such that $p_1<pf<p_2$ will be separated according to rule (b) and those such that $pf>p_2$ will be separated according to rule (c).

Such a rule may in actual fact be defined on the basis of variants of pf, such as pupf defined above for example.

Various stopping criteria may be used.

1. Diameter of the Search Zone

A stopping criterion may be the examination of a node N such that $w(X)\leqq\epsilon$ where X is the interval of variations of the variables for N. Of course, this presupposes proper scaling of the variables.

2. Diameter of the Objective Function

A stopping criterion may be the examination of a node N such that $w(F(X))\leqq\epsilon$ where X is the interval of variations of the variables for N.

3. Maximum Execution Time

A supplementary stopping criterion may be a maximum execution time beyond which the algorithm is stopped, regardless of the results obtained. A stopping criterion of this type is necessary as a possible supplement to another so as to avoid excessively long explorations.

An exemplary flowchart illustrating the B&B procedure (separation of variables and evaluation) and constraint propagation procedure applied in a solver for an optimal and exact solution within the framework of the configuration of a gas transport network will now be described with reference to FIG. 11.

To implement this technique, a library of intervals is set up to allow the management of the variables expressed in the form of numbers or intervals.

Moreover, automatic differentiation schemes based on calculation trees make it possible to calculate the values of the first and second derivatives from a mathematical expression.

Means are also implemented for calculating Taylor expansions to orders 1 and 2.

Figure 11:
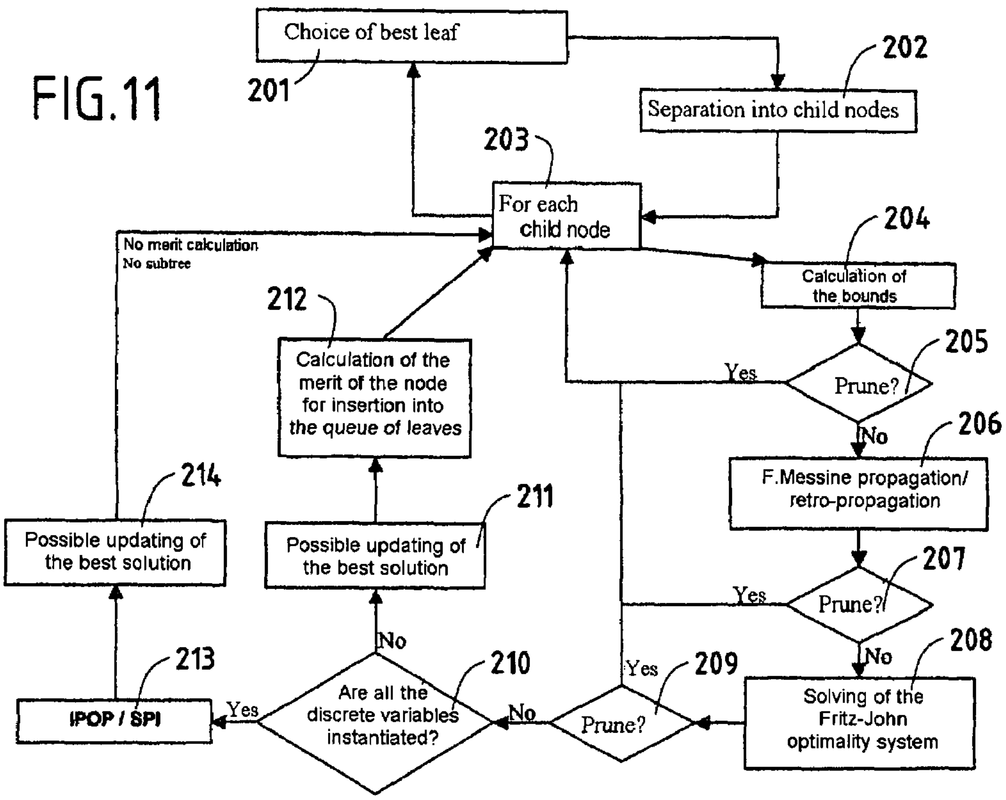
FIG. 11 is a flowchart illustrating an exemplary implementation of the optimization method according to the invention.

In the flowchart of FIG. 11, steps 201, 202 and 203 correspond to global steps of the B&B method, whereas steps 204, 206, 208, 211, 212, 214 are applied at each stage of the B&B method. The references 205, 207, 209, 210 correspond to tests culminating in a yes or no response which makes it possible to choose the scheme to be followed.

More particularly, step 201 corresponds to the choice of the best leaf of the tree to be explored. Step 202 consists of a separation into child nodes. Step 203 comprises a series of operations performed for each child node.

Thus, step 203 first goes to a step 204 for calculating the bounds, then a pruning test 205 is performed thereafter. If the response is yes, we return to step 203 to process another child node. If the response to the test 205 is no, we go to a propagation/retropropagation step 206 such as that proposed for example by F. Messine.

After step 206 a new pruning test 207 is performed. If the response is yes, we return to step 203, if on the other hand the response is no, we may go directly to another test 210, but according to a preferred embodiment, the Fritz-John optimality system is solved firstly in step 208, this being described in greater detail later. On exiting step 208, a new pruning test 209 makes it possible to return to step 203 if the responses is yes or to go to the test 210 if the response is no (absence of pruning).

The test 210 makes it possible to examine whether or not all the discrete variables are instantiated.

If all the discrete variables are not all instantiated, we go to a step 211 of possible updating of the best solution, then to a step 212 of calculating the merit of the node for insertion into the queue of leaves and we return to the calculation step 203 for another child node.

If the test 210 makes it possible to determine that all the discrete variables are instantiated, then we can go to a step 214 of possible updating of the best solution and we return to the calculation step 203 for another child node, without any merit calculation or subtree.

By way of a variant, if the test 210 makes it possible to determine that all the discrete variables are instantiated, then we can firstly go to a step 213 of implementing a nonlinear solver which makes it possible to perform a nonlinear optimization based for example on an interior points procedure.

After step 213 we go to step 214 described previously. The example of FIG. 11, without steps 208, 209 and 213, is explained again below.

We start from a sorted list of nodes to be explored (step 201). The sort is performed according to a merit calculated for each node. It is for example possible to perform an exploration according to the "best first" procedure mentioned earlier. In this case, a node is explored by priority when it exhibits the lowest min bound of the objective function.

A pruning test (steps 205, 207) is performed several times in the course of the method. If the node cannot improve the current solution, it will not be explored further.

The principle of the B&B method is to split a node into child nodes (step 202). By way of example, the following separation law is chosen: the interval of the variable of the current node which has the largest diameter (the largest difference between the upper bound and the lower bound of its interval) is separated into two intervals. These two new nodes are then placed in a list of child nodes of the current node. Next, for each child node (step 203), the objective function is evaluated, that is to say the bounds of the objective function are evaluated on the basis of the intervals of the variables of this node (step 204).

The resulting algorithm may for example be the following:

```
While the list L of nodes to be explored is not empty
  CurrentNode = L. FirstElement;
  If CurrentNode.PruningTest = false //the current node
  may contain a solution
    CurrentNode.Separate; //the interval is cut
    according to a separation law
    For i = 0 to CurrentNode.ListChildNodes.size //for
    each child node
      ChildNode = CurrentNode.ListChildNodes[i];
      ChildNode = BoundsEvaluate; //evaluation of the
      min and max bounds of the objective function
      If ChildNode.PruningTest = false
        Res = ChildNode.Propagate; //propagation
        If Res I = 0 //propagation does not lead to
        empty intervals
          ChildNode.BoundsEvaluate; //evaluation of
          the min and max bounds of the objective
          function
          If ChildNode.PruningTest = false
            If ChildNode.Feasible = true //we check
            that the child node contains at least
            one feasible solution
              TestUpdateSolution; //update the best
              current solution if appropriate
              If ChildNode.Instantiated = false //
              there are still uninstantiated
              discrete variables
                ChildNode.CalculateMerit;
                L.Insert(ChildNode);
              End If
            End If
          End If
```

-continued

```
        End If
      End If
    End For
  End If
End While
```

By way of variant, a node could be separated into more than two child nodes (multi-section, for example quadri-section).

Indicated below are a few supplements relating to step 208 of solving the Fritz-John optimality system which may afford a response to the problem of updating the max bound of the optimum while enabling a verdict to be reached regarding the feasibility of a node.

Let us consider the following optimization problem:

$$\begin{cases} \min f(X) \\ C_I(X) \le 0,\ i = 1 \ldots p \\ C_E(X) \le 0,\ i = 1 \ldots q \\ X \in R^n \end{cases}$$

The most natural approach for solving this optimization problem is to consider the system of equations arising from the Karush-Kuhn-Tucker (KKT) optimality conditions. However, these optimality conditions have the drawback of producing a degenerate system of equations if certain constraints are linearly dependent in the solution. To obtain a more robust approach, the Fritz-John optimality conditions presented below are used.

The Fritz-John conditions state that there exist $\lambda_0, \ldots, \lambda_p$ and $\mu_1, \ldots \mu_q$ which satisfy the following optimality system:

$$\begin{cases} \lambda_0 \nabla f(X) + \sum_{i=1}^{p} \lambda_i \nabla C_I^i(X) + \sum_{j=1}^{q} \mu_i \nabla C_E^j(X) = 0 \\ \lambda_i C_I^i(X) = 0,\ i = 1 \ldots p \\ C_E^j(X) = 0,\ j = 1 \ldots q \\ \lambda_i \ge 0,\ i = 1 \ldots p \end{cases}$$

Let us note that the multipliers $\mu_j$ may be positive or negative whereas the multipliers $\lambda_i$ are exclusively positive.

A first difference between the KKT conditions and the Fritz-John conditions lies in the fact that the latter introduce the Lagrange multiplier $\lambda_0 \neq 1$.

A second difference still relating to the Lagrange multipliers is that, for the Fritz-John conditions, the multipliers $\lambda_i$ and $\mu_j$ may be initialized, respectively, with the intervals [0,1] and [−1,1] whereas, for the KKT conditions, the multipliers $\lambda_i$ and $\mu_j$ are initialized, respectively, with the intervals [0,+∞] and [−∞,+∞]

The Fritz-John optimality conditions do not include, at the outset, any normalization condition. In this case it may be noted that there are (n+p+q+1) variables and (n+p+q) equations, hence more variables than equations. Hence, the following normalization condition can be considered:

$$\lambda_0 + \ldots + \lambda_p + e_1\mu_1 + \ldots + e_q\mu_q = 1 \text{ where } e_j = [1, 1+\epsilon_0],\ j=1 \ldots q \tag{CN1}$$

where $\epsilon_0$ is the smallest number such that, depending on the machine precision, $1+\epsilon_0$ is strictly greater than 1. or:

$$\lambda_0 + \ldots + \lambda_p + \mu_1^2 + \ldots + \mu_q^2 = 1 \tag{CN2}$$

In the case of an interval optimization problem:

$$\begin{cases} \min F(X) \\ C_I(X) \le 0,\ i=1 \ldots p \\ C_E(X) \le 0,\ i=1 \ldots q \\ X \in IR^n \end{cases} \quad (ICSP)$$

This is an Interval Constraint Satisfaction Program (ICSP). We then write:

$$R_1(\Lambda, M)=\lambda_0+\ldots+\lambda_p+e_1\mu_1+\ldots+e_q\mu_q-1$$

$$\text{and } R_2(\Lambda, M)=\lambda_0+\ldots+\lambda_p+\mu_1^2+\ldots+\mu_q^2-1$$

where $\Lambda(\lambda_0 \ldots \lambda_p)^T$ and $M=(\mu_0 \ldots \mu_q)^T$ (CN1) may then be written:

$$R_1(\Lambda, M)=0$$

and (CN2):

$$R_2(\Lambda, M)=0$$

To solve the system of Fritz-John optimality conditions, we put:

$$t=(X, \Lambda, M)^T$$

and:

$$\Phi(t) = \begin{pmatrix} R_k(t) \\ \lambda_0 \nabla f(X) + \sum_{i=1}^{p} \lambda_i \nabla C_I^i(X) + \sum_{j=1}^{q} \mu_i \nabla C_E^j(X) \\ \lambda_1 C_I^i(X) \\ \vdots \\ \lambda_p C_I^p(X) \\ C_E^1(X) \\ \vdots \\ C_E^q(X) \end{pmatrix}$$

where $k = 1$ or $2$

We denote by t a box of dimension N, where N=n+p+q+1, containing t. Let J be the Jacobian of Φ. For i, j=1 . . . N:

$$J_{ij}(t, t') = \frac{\partial}{\partial t_j} \Phi_i(T_1, \ldots, T_j, t_{j+1}, \ldots, t_N)$$

The first j arguments of $J_{ij}(t,t')$ are intervals, the subsequent ones are reals. By using the linear normalization (CN1), the Jacobian of Φ will involve the Lagrange multipliers only in the form of reals and not of intervals. Thus, to solve Φ(t)=0, there is zero need to initialize the interval for the multipliers.

Using (CN2) implies that the Lagrange multipliers appear in the Jacobian as intervals and increases the risks of obtaining a singular matrix. A Newton procedure may then either fail or be ineffective. In this case, it is necessary to envisage cutting the intervals. However, splitting the intervals of the multipliers involves, a priori, an enormous number of additional calculations.

Hence the recommendation to use (CN1) and the order of the variables of t as indicated above. All the more so as (CN1) exhibits a favourable linear character.

By using (CN1), certain Newton procedures do not require the initialization of an interval for the Lagrange multipliers. However, it may be beneficial to employ it in certain cases. In particular, there may be a need for an estimate of the values of the multipliers, this being the case in the network calculation problem. Such an estimate for a multiplier can be obtained by adopting the middle of its interval; an enclosure is therefore required. The following procedure can be used to determine it:

We put:

$$A(X) = \begin{bmatrix} 1 & 1 & \cdots & 1 & e_1 & \cdots & e_q \\ \nabla f(X) & \nabla C_I^1(X) & \cdots & \nabla C_I^p(X) & \nabla C_E^1(X) & \cdots & \nabla C_E^q(X) \end{bmatrix}$$

If we solve:

$$A(X)\begin{pmatrix} \Lambda \\ M \end{pmatrix} = \begin{pmatrix} 1 \\ 0 \\ \vdots \\ 0 \end{pmatrix}$$

we obtain the desired enclosure for the Lagrange multipliers.

The use of the Fritz-John optimality conditions within the solver may be useful from two standpoints. The first is that they may further reduce the solution space by supplementing or replacing the propagation of constraints onwards of a certain level of the tree of the B&B procedure. The second stems from the fact that the solving of the Fritz-John optimality conditions is a Newton operator. It is then possible to apply the Moore-Nickel theorem which states that if a Newton operator makes it possible to reduce an interval of definition of one variable at least, then the current solution space necessarily contains an optimum. Thus, the solving of these optimality conditions may also be a criterion for updating the max bound of the optimum of the objective function.

The above linear system (SL) may be solved, for example, with the iterative Gauss-Seidel procedure (or constraint propagation procedure) or with the LU procedure.

In a linear system such as that posed by linearizing the optimality conditions of an optimization problem, of the form:

$$A.X+B=0 \quad \text{(SL)}$$

A is an m×n matrix of reals or intervals, X is the vector of variables of dimension n, B is a vector of dimension m of reals or intervals.

The Gauss-Seidel procedure is an iterative procedure ensuing from an improvement to the Jacobi procedure.

An iterative procedure for solving a linear system such as (SL) consists in constructing a series of vectors Xk which converges to the solution X*. In practice, iterative procedures are rarely used to solve linear systems of small dimensions since, in this case, they are generally more expensive than direct procedures. However, these procedures turn out to be efficient (in cost terms) in cases where the linear system (SL) is of large dimension and contains a large number of zero coefficients. The matrix A is then said to be sparse; this is the case during a network calculation.

The iterative Jacobi procedure consists in solving the $i^{th}$ equation as a function of $X_i$ to obtain:

$$X_I = \frac{B_I}{A_{ii}} - \sum_{\substack{j=1 \\ j \neq i}}^{n} \frac{A_{Ij} \times X_j}{A_{ii}}$$

We construct the term $X^k$ from the components of $X^{k-1}$:

$$X_i^k = \frac{B_i}{A_{ii}} - \sum_{\substack{j=1 \\ j \neq i}}^{n} \frac{A_{ij} \times X_j^{k-1}}{A_{ii}}$$

Now, when calculating $X^k$ the components $X_j^k$ for j<i are known. The Gauss-Seidel procedure substitutes $X_j^k$ with $X_j^{k-1}$ for j<i.

In the network calculation problem, the elements of A, X and B are intervals. The algorithm is therefore as follows:

```
// Initialization
k = 0
SE = Ø
// Recovery of the diagonal elements of A not
containing 0
For i = 1 to A.N
If 0 ≠ A_{i,i} and X_i nondegenerate, that is to say not
reduced to a point, Then
End If
End For
// Calculate the components of x
While SE ≠ Ø and k < maximum number of iterations
    k = k + 1
    e = SE(1)
    SE = SE − {SE(l)}
    i = e.line
    tmp = 1/e × ( B_l − Σ_{j=1, i≠i}^{A.N} A_lj × X_j )
    // Test for end
    xx = X_i ∩ tmp
    If XX ⊂ X_i Then // strict inclusion
        X_i = XX
        For j = 1 to A.N, j ≠ i
            If A_{j,j} ≠ SE Then
                SE = SE + {A_{j,j}}
            End If
        End For
    End If
End While
```

The LU procedure decomposes the matrix A of the system (SL) according to the following product:

A=L.U where L is a lower triangular matrix with unit diagonal:

$$L = \begin{pmatrix} 1 & 0 & \cdots & 0 \\ L_{21} & 1 & \ddots & \vdots \\ \vdots & \ddots & \ddots & 0 \\ L_{n1} & \cdots & L_{nn-1} & 1 \end{pmatrix}$$

and U is an upper triangular matrix:

$$U = \begin{pmatrix} U_{11} & \cdots & U_{1n} \\ \vdots & \ddots & \vdots \\ 0 & \cdots & U_{nn} \end{pmatrix}$$

The system therefore becomes:

L.U.X=B (SL')

which can be decomposed into two systems:

$$\begin{cases} L \cdot Y = B \\ U \cdot X = Y \end{cases}$$

The solving of (SL1) followed by (SL2) is greatly facilitated by the triangular form of L and U.

Figure 13:
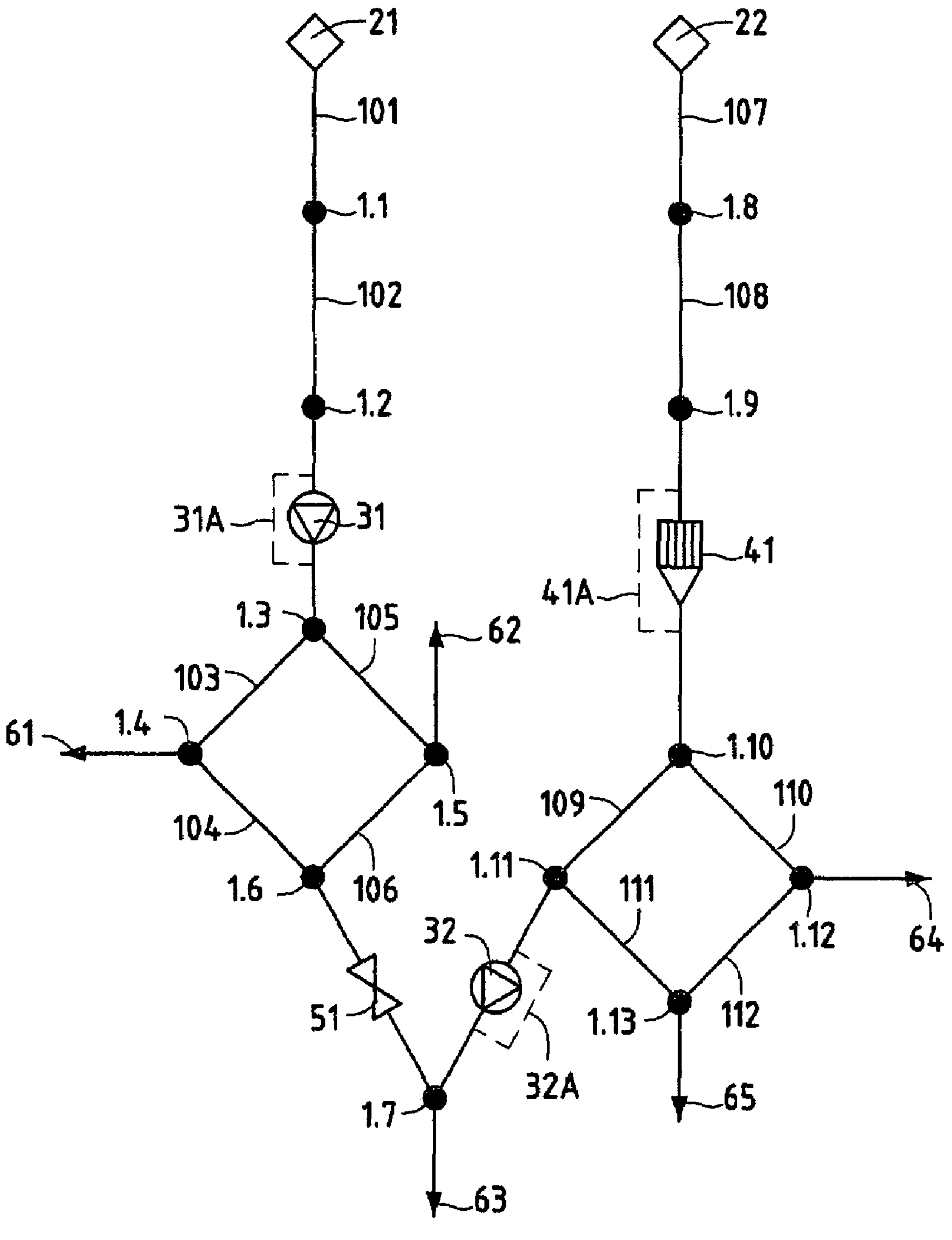
FIG. 13 is a schematic view of an exemplary natural gas transport network to which the invention is applicable.

FIG. 13 shows an exemplary network to which the automatic optimization method according to the invention is applicable.

This network comprises a set of interconnection points (junctions or nodes) 1.1 to 1.13 which make it possible to link together passive pipelines 101 to 112 or stretches of pipeline comprising active works such as regulating valves 31, 32, a compression station 41, an isolating valve 51, consumptions 61 to 65 or resources 21, 22.

Bypass conduits 31A, 32A, 41A are associated with the regulating valves 31, 32 and with a compression station 41.

What is claimed is:

1. A method for the automatic optimization of a natural gas transport network in the steady state, the natural gas transport network comprising at one and the same time a set of passive works including pipelines or resistances, and a set of active works comprising regulating valves, isolating valves, compression stations each with at least one compressor, storage or supply devices, consumption devices, elements for bypassing the compression stations and elements for bypassing the regulating valves, the passive works and the active works being linked together by junctions, the optimization method comprising the determination of values for continuous variables such as the pressure and the flow rate of the natural gas at any point of the transport network, and the determination of values for discrete variables such as the startup state of the compressors, the state of opening of the compression stations, the state of opening of the regulating valves, the state of the elements for bypassing the compression stations, the state of the elements for bypassing the regulating valves, the orientation of the compression stations and the orientation of the regulating valves, characterized in that intervals of values for the continuous variables and sets of values for the discrete variables are chosen as initial state of the optimization, in that the possibilities of values for the variables are explored by constructing on the go a tree with branches linked to nodes describing the combinations of values envisaged by using a technique of separation of variables, that is to say of cutting leading to the generation of new nodes in the tree, and of evaluation, that is to say of determination with a high probability of the branches of the tree which may lead to leaves constituting an optimized final solution, so as to traverse by priority these branches having greater probability of success, the values of the quantities sought being considered to be optimal when predetermined constraints are no longer violated or are minimally violated and a predetermined objective function is minimized, this objective function being of the form $$g=\alpha\times\text{Regime}+\beta\times\text{Energy}+\gamma\times\text{Target}$$

with: α, β and γ are weighting coeffecients;

regime represents a minimization or maximization factor for the pressure at given points of the network such as any point downstream of a storage or supply device, any point upstream and any point downstream of a compression station or of a regulating valve, and any point upstream of a consumption device, Energy represents a minimization factor for the consumption of compression energy, Target represents a maximization or minimization factor for the flow rate of a stretch of the network situated between two junctions or the pressure of a particular junction, and the said predetermined constraints comprising on the one hand equality constraints comprising the law for the head loss in the pipelines and the node law governing the calculation of networks, and on the other hand inequality constraints comprising minimum and maximum flow rate constraints, minimum and maximum pressure constraints for the active or passive works, compression power constraints for the compression stations.

2. A method according to claim 1, characterized in that the problem of the optimal configuration of the active works is modelled in the form of an optimization programme $P_1$ that takes the following form:

$$P_1\begin{cases}\min_{(x,s,e)} f(x,s)=g(x)+\alpha\times\|s\|^2\\ C_I(x)+\beta\cdot e\le s_I\\ C_E(x)=s_E\\ x\in R^n,\ s_I\in R^p,\ s_E\in R^q,\ e\in\{0,1\}^p\end{cases}$$

with: x is the set of variables for the flow rates Q and pressures P, g(x) is the objective function constituting the economic optimization criterion, $C_I(x)$ is the set of p linear and nonlinear inequality constraints on the active works, β is a vector whose coefficients are zero or equal to the maximum values of the constraints, e is the vector of binary variables, $C_E(X)$ is the set of q linear or nonlinear equality constraints, s is a deviation variable which, when it is nonzero, represents the violation of a constraint, α is a coefficient representing the degree of permission to violate constraints.

3. A method according to claim 1, characterized in that the variables are represented by intervals, in that the separation of variables technique is applied to the discrete variables only and in that bounds of the objective function are calculated by using the arithmetic of intervals.

4. A method according to claim 1, characterized in that the variables are represented by intervals, in that the separation of variables technique is applied at one and the same time to the discrete variables and to the continuous variables, said separation comprising the cutting of the definition space of the continuous variables, an exploration being performed separately on parts of the realisable set and the interval of variation of the objective function being evaluated on each of these parts.

5. A method according to claim 4, characterized in that during the exploration of the possibilities of values for the variables with a separation of variables and evaluation technique, a list of nodes to be explored sorted according to a merit criterion M calculated for each node is firstly established, so long as the list of nodes to be explored is not empty, for each current node, an evaluation is made as to whether this current node can contain a solution, if so, the interval corresponding to the variable considered is cut according to a separation law to establish a list of child nodes, for each child node minimum and maximum bounds of the objective function are evaluated and an evaluation is made as to whether the child node can improve the current situation, if so, a propagation of the constraint over its variables is performed, if the propagation does not lead to empty intervals, minimum and maximum bounds of the objective function are evaluated and it is verified that it is not impossible for the child node to contain at least one feasible solution, a test is performed to determine whether there are still noninstantiated discrete values, that is to say variables for which no precise and definitive value could be decided, the best current solution is updated if appropriate and the merit of the node is calculated so as to insert it into the list of leaves, sorted according to this merit criterion.

6. A method according to claim 5, characterized in that the merit criterion M is such that a node is explored by priority when it exhibits the smallest minimum bound of the objective function.

7. A method according to claim 5, characterized in that during the tests for eliminating the nodes that cannot contain the optimum, one of the procedures consisting in using the monotonicity of the objective function, in using a test of violated constraints or in using a test of objective value that is not as good as the current value is implemented.

8. A method according to claim 5, characterized in that during the separation of a current node into child nodes, the domain of variation of one or more chosen variables is divided according to criteria based on the diameter of intervals tied to the variables.

9. A method according to claim 5, characterized in that it comprises, furthermore, a stopping criterion based on the execution time or on the evaluation of certain interval diameters.

10. A method according to claim 5, characterized in that as a supplement to the propagation of the constraints, the maximum bound of the optimum of the objective function is updated using the so-called Fritz-John optimality conditions of the optimization problem.

11. A method according to claim 5, characterized in that when at a node of the separation and evaluation method all the discrete variables have been instantiated, a nonlinear optimization process based on an interior points procedure is moreover implemented.

12. A method according to claim 5, characterized in that at each node of the separation and evaluation method, a nonlinear optimization process based on an interior points procedure is moreover implemented.

* * * * *

UNITED STATES PATENT AND TRADEMARK OFFICE
CERTIFICATE OF CORRECTION

PATENT NO. : 7,561,928 B2
APPLICATION NO. : 11/800416
DATED : July 14, 2009
INVENTOR(S) : Eglantine Peureux et al.

It is certified that error appears in the above-identified patent and that said Letters Patent is hereby corrected as shown below:

Column 10, line 36, "$C_b(c)$," should read --$C_b(x)$,--;

Column 12, line 50, "($e_d^1$=l)." should read -- $(e_d^1 = 1)$.--;

Column 12, line 51, "$f_{min}^i$" should read -- $f'_{min}$ --;

Column 12, line 54, "$f_{max}^i$" should read -- $f'_{max}$ --;

Column 12, line 57, "$f_{min}^1 > f_{max}^1$ (with $f_{max}^1 = f_{max}^0$)" should read -- $f^1_{min} > f^1_{max}$ (with $f^1_{max} = f^0_{max}$), --;

Column 12, line 58, "($e_d^1$=0)" should read -- $(e_d^1 = 0)$ --;

Column 12, line 60, "$f_{min}^1 \leqq f_{max}^1$" should read -- $f^1_{min} \leq f^1_{max}$ --;

Column 18, line 30, "2. Optimum Estimated" should read --b. Optimum Estimated--; and Column 29, claim 1, line 6, "regime" should read --Regime--.

Signed and Sealed this

Sixth Day of July, 2010

David J. Kappos

David J. Kappos
*Director of the United States Patent and Trademark Office*